(12) United States Patent
Jannu et al.

(10) Patent No.: US 7,216,181 B1
(45) Date of Patent: May 8, 2007

(54) MIDDLEWARE BROKERING SYSTEM

(75) Inventors: Shrikant Jannu, Irving, TX (US); Dora Potluri, Irving, TX (US); Denis Tsai, Dallas, TX (US); Wing Lee, Irving, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 554 days.

(21) Appl. No.: 09/919,436

(22) Filed: Jul. 31, 2001

(51) Int. Cl.
G06F 15/16 (2006.01)

(52) U.S. Cl. .................................... 709/246; 709/201

(58) Field of Classification Search ............... 709/206, 709/207, 218, 246, 217, 201, 204; 719/313, 719/315, 330
See application file for complete search history.

(56) References Cited

U.S. PATENT DOCUMENTS

| | | | | |
|---|---|---|---|---|
| 5,680,551 A * | 10/1997 | Martino, II | ................. | 709/226 |
| 5,764,750 A * | 6/1998 | Chau et al. | ................. | 379/229 |
| 5,790,809 A * | 8/1998 | Holmes | ...................... | 709/228 |
| 5,987,497 A * | 11/1999 | Allgeier | ..................... | 709/201 |
| 6,381,644 B2 * | 4/2002 | Munguia et al. | ............ | 709/225 |
| 6,721,779 B1 * | 4/2004 | Maffeis | ....................... | 709/202 |
| 6,738,975 B1 * | 5/2004 | Yee et al. | ................... | 719/310 |
| 6,772,413 B2 * | 8/2004 | Kuznetsov | .................. | 717/136 |
| 6,782,540 B1 * | 8/2004 | Chow et al. | ................ | 719/316 |
| 6,868,441 B2 * | 3/2005 | Greene et al. | .............. | 709/220 |
| 6,877,023 B1 * | 4/2005 | Maffeis et al. | .............. | 709/202 |
| 6,904,598 B2 * | 6/2005 | Abileah et al. | ............. | 719/319 |
| 6,910,216 B2 * | 6/2005 | Abileah et al. | ............. | 719/319 |
| 6,922,685 B2 * | 7/2005 | Greene et al. | ................. | 707/1 |
| 6,948,174 B2 * | 9/2005 | Chiang et al. | .............. | 719/319 |
| 6,954,799 B2 * | 10/2005 | Lerner | ........................ | 709/240 |
| 6,956,865 B1 * | 10/2005 | Khaunte et al. | ............ | 370/442 |
| 6,978,461 B2 * | 12/2005 | Shapiro et al. | ............. | 719/311 |
| 7,010,609 B1 * | 3/2006 | Black et al. | ................ | 709/230 |
| 7,051,334 B1 * | 5/2006 | Porter et al. | ................ | 719/313 |
| 2001/0014910 A1 * | 8/2001 | Bobo, II | ..................... | 709/206 |
| 2001/0049702 A1 * | 12/2001 | Najmi | ........................ | 707/513 |
| 2003/0037174 A1 * | 2/2003 | Lavin et al. | ................ | 709/313 |
| 2003/0163585 A1 * | 8/2003 | Elderon et al. | ............. | 709/246 |
| 2004/0122892 A1 * | 6/2004 | Brittenham et al. | ........ | 709/203 |
| 2004/0221292 A1 * | 11/2004 | Chiang et al. | ............. | 719/310 |

OTHER PUBLICATIONS

Xiong et al, "Middleware-based solution for enterprise information integration", Emerging Technologies and Factory Automation, 2001. Proceedings, 2001 8th International Conference on, vol. 2, Oct. 15-18, 2001 pp. 687-690.*

(Continued)

*Primary Examiner*—Andrew Caldwell
*Assistant Examiner*—Douglas Blair

(57) ABSTRACT

The present invention, known as the Middleware Brokering System, brokers messages between middleware computing products. Each middleware service can send data to the Middleware Brokering System in its native data format and programming syntax. The Middleware Brokering System converts the data transmitted from the different platforms into a standard format known as a structured event. Messages are then transmitted to and stored in an underlying, commercially available publish/subscribe engine. The Middleware Brokering System contains internal logic that determines whether any subscribers are interested in the messages. If an interested subscriber is found, the Middleware Brokering System retrieves the message from the publish/subscribe engine, converts the data from the structured event into the native format of the receiving application, and sends the message to the appropriate application.

16 Claims, 5 Drawing Sheets

OTHER PUBLICATIONS

Quinot et al, "DROOPI: towards a generic middleware", Jun. 2001, ACM SIGAda Ada Letters, vol. XXI Issue 2.*

Bernstein, Philip A., "Middleware: a model for distributed system services", Feb. 19996, Communications of the ACM, vol. 39, Issue 2.*

IBM MQSeries, "MQSeries: Message Oriented Middleware,", May 23, 2001, pp. 1-5, www-4.ibm.com/software/ts/mqseries/library/whitepapers/mqover/.

Message Oriented Middleware and MQSeries, "Xinetica White Paper," May 23, 2001, pp. 1-12, www.xinetica.com/tech_explained/technical/mq_series/wp_mq_series.html.

1999 Software Symposium Title, "The Architecture of the READY Event Notification Service", Jan. 3, 2001, pp. 1-8, www.research.att.com/~ready/omniNotify/PAPERS/ss99ready.html.

Notification Service, "Joint Revised Submission", Aug. 2, 1999, pp. 1-208, www.ftp://ftp.omg.org/pub/docs/telecom/99-07-01.pdf.

* cited by examiner

Figure 5

A method for asynchronous brokering of messages between middleware computing systems, comprising:

Receiving a message from a sending middleware computing system into a middleware brokering server Sending the message from the middleware brokering server to at least one receiving middleware computing system Wherein the message is converted from a native language format of the sending middleware computing system to a structured event message format prior to being sent by the middleware brokering server Wherein the message is converted from a structured event message format to a native language format of the receiving middleware computing system prior to being received by the receiving middleware computing system

MIDDLEWARE BROKERING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention relates to the field of communication within computer networks containing heterogeneous computer systems and more particularly to communication between systems connected by disparate middleware products.

BACKGROUND OF THE INVENTION

Computer systems operating under heterogeneous platforms cannot always exchange data directly among themselves. Numerous types of commercially available products known collectively as middleware have been developed to facilitate data exchange between disparate computer systems. Instead of communicating directly with each other, computer systems can send data in their native format to the middleware. The middleware then sends the data to another system in a format understandable by the second system. Among the categories of middleware are message-oriented middleware and object request brokers.

If a middleware product is not used, a heterogeneous computer system would typically need to operate in a point-to-point mode, for example using message queuing as point-to-point. Under the point-to-point approach, illustrated in FIG. 1, if six separate and distinct applications 120, 122, 124, 126, 128, and 130 are to communicate, connections 101–115 must be made between every possible pair of systems. This type of configuration is undesirable for several reasons. First, the number of connections is large. The number of connections required in a system of n components is $(n^2-n)/2$. For example, a six component system such as that in FIG. 1 requires $(36-6)/2$ or 15 connections. Second, the point-to-point mode requires tight coupling between each pair of platforms. That is, if each type of technology uses its own data format, a specifically designed adapter is needed between each pair to allow communication between the two. Third, the point-to-point approach creates vendor dependency. The adapters between platforms must meet the requirements of the manufacturers of each system. If a piece of equipment is replaced, the adapters between the new equipment and all other systems must be redesigned.

The use of middleware allows computer systems to operate in a broker mode, sometimes referred to as a hub and spoke configuration. This approach, as illustrated in FIG. 2, is an improvement over the point-to-point approach. In this configuration, each application 220, 222, 224, 226, 228, and 230 communicates only with the broker 232 thereby reducing the number of connections 201–206 needed. For example, this six-application system would require only six connections, numbered 201–206, as opposed to the fifteen needed for six applications connected in the point-to-point mode. Message-oriented middleware products operating in the publish/subscribe mode are an example of brokering middleware. Since these products can typically send and receive data in the native data formats of the applications they connect, adapters are typically not needed to convert data from the format of the applications to the format of a publish/subscribe engine serving as the brokering hub. This reduces vendor dependency and increases system flexibility over the point-to-point approach.

In the publish/subscribe paradigm, a packet of data in a specified format is called a message. An application that sends a message out is called a publisher and an application that receives a message is called a subscriber. The publisher sends its message to a central hub or publish/subscribe engine and includes information about the content of the message. Subscribers perform a process known as registration in which they inform the publish/subscribe engine about what types of message subject matter they are interested in. The publish/subscribe engine matches the content data from the publishers with the registration data from the subscribers and sends the messages to the appropriate subscribers. In this way, publishers can ensure that messages reach an interested audience and subscribers can ensure that unwanted messages are not received. The transmission of messages under the publish/subscribe approach is done in an asynchronous manner. That is, the publisher and the subscriber do not need to communicate with each other at the same time. The publish/subscribe engine can hold a published message until an interested subscriber retrieves it at a later time. Since applications typically can both send and receive messages, a particular application can act as a publisher and/or a subscriber at various times in the communication process.

Among the commercial products that act as publish/subscribe message-oriented middleware are IBM's MQSeries and Sun Microsystems's Java Message Service (JMS). The MQSeries messaging system is described in more detail in the following reference publications, the entire contents of which are incorporated herein by reference:

MQSeries for AIX V5.0 Quick Beginnings (http://www.software.ibm.com/ts/mqseries/library/manuals/amqaac/AMQAAC01.HTM)

MQSeries Application Programming Guide (http://www.software.ibm.com/ts/mqseries/library/manuals/csqzal/CSQZAL01.HTM)

MQSeries Application Programming Reference (http://www.software.ibm.com/ts/mqseries/library/manuals/csqzak/CSQZAK01.HTM)

MQSeries Using C++

(http://www.software.ibm.com/ts/mqseries/library/manuals/amqzan/AMQZAN01.HTM)

The JMS messaging system is described in more detail in the following reference publications, the entire contents of which are incorporated herein by reference:

Java Message Service API (http://www.javasoft.com/products/jms)

Java Message Service Documentation (http://www.javasoft.com/products/jms/docs.html)

Object request brokers are the other major category of middleware and their functions and capabilities have been standardized by the Object Management Group (OMG) in a specification known as the Common Object Request Broker Architecture (CORBA). The CORBA distributed object system is implemented under the CORBA specification from the OMG, Revision 2.0, Revision 2.1, Revision 2.2, and Revision 2.3, all of which are incorporated herein by reference in their entirety. For purposes of this disclosure, a program compliant with CORBA Revision 2.3, 2.2, and 2.1 by definition will be viewed as compliant with CORBA Revision 2.0. Unless otherwise specified, a generic reference to CORBA will be presumed to be OMG's CORBA Services Revision 2.0 and a generic reference to CORBA-compliant or to a CORBA platform or program or system will be viewed as compliant with CORBA Services Revision 2.0

Any one of these publish/subscribe or object oriented middleware products can be used to allow heterogeneous computer systems to communicate with each other. However, communication cannot necessarily be established directly from one of these middleware products to another. In a computer system using more than one of these middleware services, applications that communicate with each other through one service would typically not be able to communicate with applications connected to another service. For example, applications that use MQSeries would typically not be able to communicate with applications using JMS. Likewise, CORBA applications would typically not be able to communicate with either MQSeries or JMS applications. The present invention solves this problem by acting as an intermediary between the middleware services in a manner analogous to the way the middleware services themselves act as intermediaries between disparate individual computer systems.

SUMMARY OF THE INVENTION

The present invention, hereafter referred to as the Middleware Brokering System, addresses the need for computer systems operating under disparate types of middleware to communicate with each other in an efficient, verifiable, flexible, and maintainable manner. The Middleware Brokering System acts as an intermediary, or meta-middleware, device among the different middleware systems. Each middleware service can send messages to the Middleware Brokering System in its native data format and programming syntax. The Middleware Brokering System receives the messages transmitted from the different platforms and converts the messages into a standard format known as a structured event. The structured events are then transmitted from the Middleware Brokering System to an underlying, commercially available publish/subscribe engine where they are stored. The Middleware Brokering System contains internal logic that determines whether any subscribers are interested in the stored messages. If an interested subscriber is found, the Middleware Brokering System retrieves the appropriate message from the publish/subscribe engine, converts the data from the structured event into the native format of the receiving application, and sends the message to the appropriate application.

The standard data format allows the Middleware Brokering System to operate in the publish/subscribe manner rather than the point-to-point mode thus minimizing the number of independent adapters needed for communication between the disparate middleware products. The standard format also reduces vendor dependency. Since all applications communicate with the Middleware Brokering System in their native language, an existing middleware system can easily be replaced by another. In addition, the data format used by the Middleware Brokering System allows quality of service attributes to be added to platforms that do not currently offer those features.

DESCRIPTION OF THE DRAWINGS

The invention, together with further advantages thereof, may best be understood by reference to the following description taken in conjunction with the accompanying drawings in which:

FIG. 5 is a flow-chart illustrating a method for asynchronous brokering of messages between middleware computing systems.

DETAILED DESCRIPTION

Figure 1:
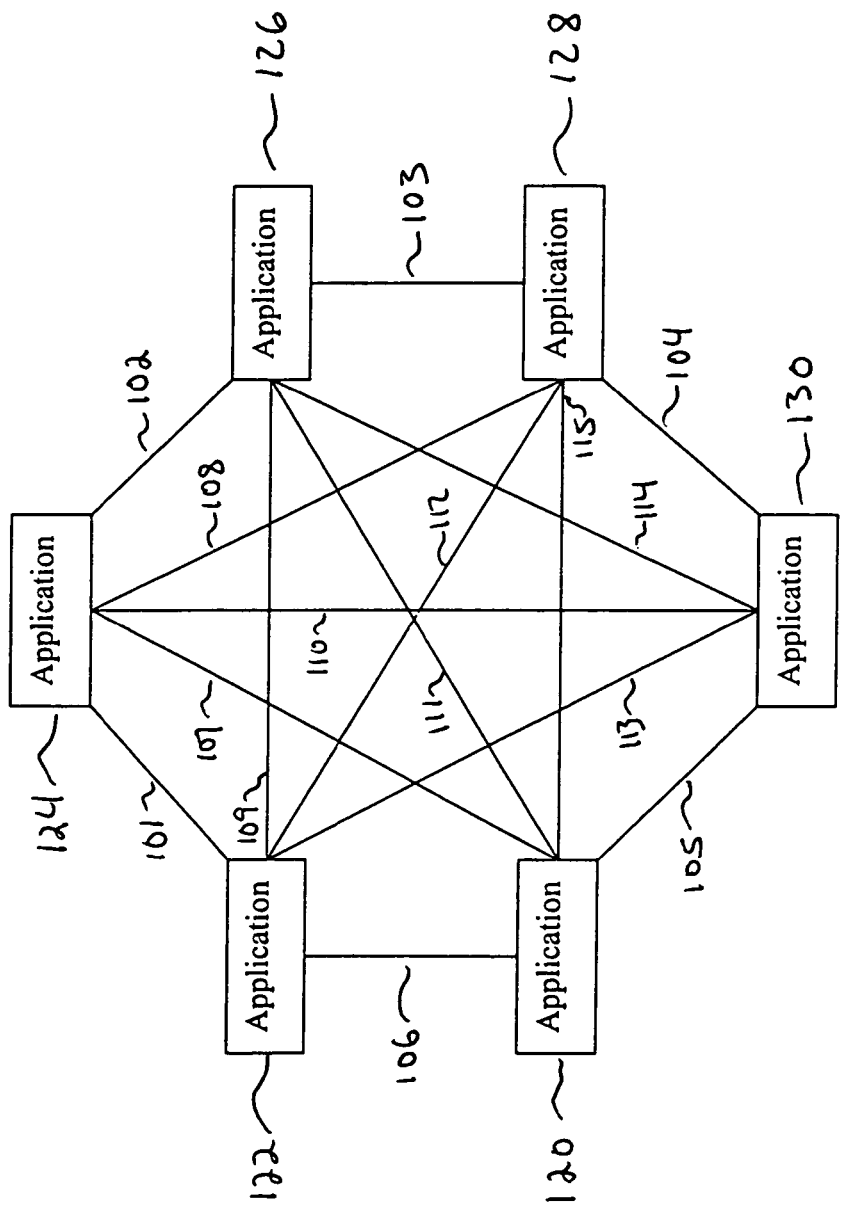
FIG. 1 is a diagrammatic representation of the point-to-point approach to the configuration of networks containing heterogeneous computing platforms.
Figure 2:
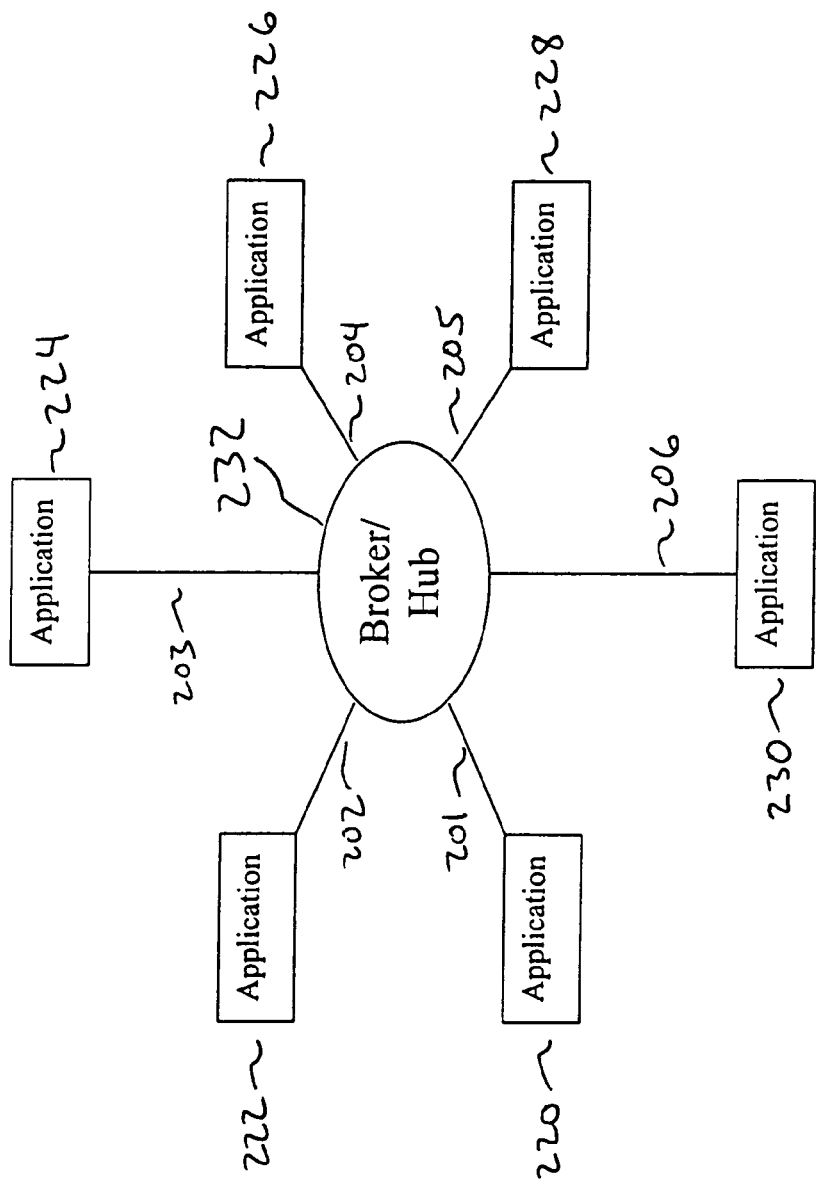
FIG. 2 is a diagrammatic representation of the hub and spoke approach to multi-platform network configuration.
Figure 3:
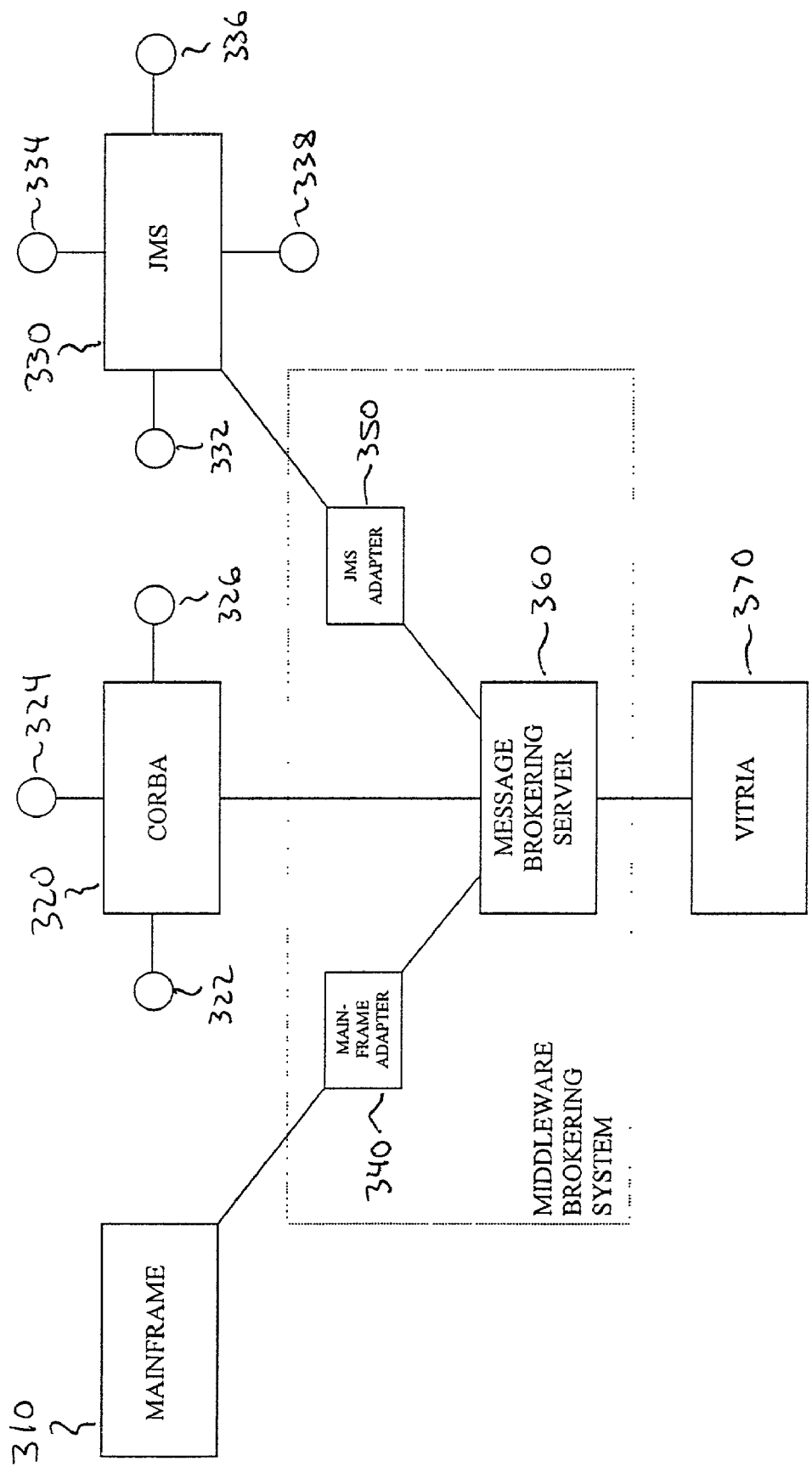
FIG. 3 is a diagrammatic representation of a computing system containing multiple types of middleware connected through the Middleware Brokering System.

The general operating principles of the invention, hereafter referred to as the Middleware Brokering System, can best be understood by reference to FIG. 3. Three disparate computing platforms are present: a mainframe system 310, a network 320 of CORBA-compliant components 322, 324, 326, and a network 330 of components 332, 334, 336, 338 connected by JMS. The mainframe system 310 can comprise any large-scale, centralized computing system. The CORBA system can comprise any network of devices complying with the OMG CORBA specification previously cited. The JMS system can comprise any network of devices using the Java Messaging Service asynchronous messaging system. JMS is a specification developed under the leadership of Sun Microsystems and several vendors have released products that implement the specification. For purposes of this application, the term JMS refers to any vendor's implementation of the JMS specification. The presence of a mainframe system 310, a CORBA network 320, and a JMS network 330 is an exemplary embodiment of the invention and the Middleware Brokering System may be configured to interconnect a wide variety of middleware systems. Other types and numbers of middleware familiar to those of skill in the art could be substituted for or added to the examples shown. In addition, the number of components 322, 324, 326, 332, 334, 336, 338 shown connected to each disparate middleware network is for illustrative purposes and the actual number of components in the middleware networks may vary greatly in carrying out the invention.

In the embodiment of FIG. 3, the Middleware Brokering System comprises a mainframe adapter 340, a JMS adapter 350, and a message brokering server 360. The mainframe adapter 340, the JMS adapter 350, and the message brokering server 360 are software components that act virtually as a unit and can reside on the same physical device or on different devices. Details of the operation of these components are provided below. In alternative embodiments, other adapters could be used instead of or in addition to the mainframe adapter 340 and the JMS adapter 350 if other types of computer systems or middleware products needed to be connected to the Middleware Brokering System. A separate CORBA adapter is not needed since CORBA applications and the Middleware Brokering System can communicate directly with each other using their common data format, the structured event.

In a preferred embodiment, the mainframe system 310 uses IBM's MQSeries middleware to interact with the Middleware Brokering System. In alternative embodiments, any middleware product equivalent to MQSeries may be used to transfer data between the mainframe 310 and the Middleware Brokering System. When a Cobol program running on the mainframe 310 needs to send a message to the CORBA network 320, the JMS network 330, or both, the data is prepared by placing it in a structure known as a Cobol copybook. In alternative embodiments, other mainframe programming languages and other equivalent data structures commonly used in those languages could be used to prepare the data. For purposes of this application, the term copybook is used to refer to any such data structure. Information about the subject matter of the message is included in the copybook which, as described below, will be used by the Middleware Brokering System to determine if the subscribers are interested in the message. The program running on the mainframe 310 uses a standard programming command to transmit the copybook to MQSeries. MQSeries then sends the data to the mainframe adapter 340, described in detail below. In alternative embodiments, additional interface layers may exist between the mainframe 310 and MQSeries or between MQSeries and the mainframe adapter 340. The mainframe adapter 340 converts the copybook into a standard format known as a structured event, also described in detail below. The mainframe adapter 340 then sends the message in the structured event format to the message brokering server 360.

Existing technology requires that mainframe systems use an object request broker to communicate with distributed systems. The adapters used in the Middleware Brokering System provide an advantage over existing technology by allowing mainframe systems to communicate with distributed systems without the use of an object request broker. Dependency on a particular vendor's object request brokering product is thus eliminated.

The JMS network 330 interacts with the message brokering server 360 in a similar manner. The JMS network 330 sends data in its native format, known as a MapMessage, to the JMS adapter 350, described in detail below. The JMS adapter 350 converts the data into the structured event format and passes it to the message brokering server 360. CORBA-compliant applications use the structured event as their native messaging format. Therefore, no conversion between messaging formats is needed when the CORBA network 320 needs to publish data. A message in the structured event format is sent directly from the CORBA network 320 to the message brokering server 360.

Other types of computing systems or middleware that might be added to the configuration depicted in FIG. 3 would publish their data to the message brokering server 360 in a similar manner. Where the middleware operates in a native language other than that of the Middleware Brokering System, the data would be transmitted to an adapter in the application's native format. The adapter would then convert the data into the structured event format and send the structured event to the message brokering server 360. The use of the message brokering server 360 and the structured event allows mainframe systems and disparate middleware products to communicate with each other in a publish/subscribe mode. Only one adapter is needed for each disparate type of middleware system to be connected. Without the message brokering server 360 and the structured event, the different types of systems would need to operate in a point-to-point fashion and the number of adapters needed would be greater.

Messages received by the message brokering server 360 are passed on to an underlying publish/subscribe engine 370. The message brokering server 360 and the publish/subscribe engine 370 act together as a broker for the messages transferred among the mainframe system 310, the CORBA network 320, and the JMS network 330. The message brokering server 360 maintains a list of subscribers and the types of messages they have registered to receive. The publish/subscribe engine 370 stores the messages in channels that can be configured with various attributes such as the number of messages that can be stored on the channel, the length of time messages are to be stored on the channel, and the priority of the messages on the channel. When the message brokering server 360 finds a match between a message sent to it by one of the publishers and a subscriber that has registered an interest in the message, the message brokering server 360 retrieves the message from the channels of the publish/subscribe engine 370 and sends the message to the appropriate subscriber. Messages are stored in the publish/subscribe engine 370 until the message expires or has been delivered to all subscribers successfully. Expiration occurs when the age of the message exceeds a preset limit or the number of messages exceeds the limit of the storage mechanism. In a preferred embodiment, the publish/subscribe engine 370 is a product developed by Vitria Technology known as BusinessWare. In alternative embodiments, any equivalent publish/subscribe engine could be substituted for the Vitria product.

The message brokering server 360 retrieves data from the publish/subscribe engine 370 and passes it in the form of a structured event to the mainframe adapter 340, the JMS adapter 350, and/or directly to the CORBA network 320. In a conversion process that is the reverse of the process described earlier, the mainframe adapter 340 converts the structured event to a copybook and sends the copybook to the mainframe 310. Likewise, the JMS adapter 350 converts the structured event into the JMS MapMessage format and sends the MapMessage to the JMS network 330. In this manner, the mainframe 310, CORBA 320, and JMS 330 systems can send data to and receive data from each other in their native formats. The underlying conversion process carried out by the Middleware Brokering System is transparent to the participating networks.

The message brokering server 360 acts as an abstraction layer on top of the publish/subscribe engine 370. Commercially available publish/subscribe engines typically have proprietary interfaces that require that data be sent to them in a format specified by the vendor of the engine. Therefore, sending of messages directly from adapters such as adapters 340 and 350 to the publish/subscribe engine 370 would create vendor dependency. Replacement of one publish/subscribe engine 370 with another would require that all adapters 340 and 350 (and any others that may be present) be rewritten to accommodate the data format of the new engine. The addition of the abstraction layer of the message brokering server 360 allows all adapters 340 and 350 to remain unchanged. The adapters 340 and 350 merely need to convert from a native data format into a structured event. The message brokering server 360 then handles the conversion from the structured event into the proprietary data format of the publish/subscribe engine 370. If a different publish/subscribe engine 370 is installed, only minor changes would be needed in the message brokering server 360 to allow it to convert from a structured event to the data format of the new publish/subscribe engine 370 and these changes will be transparent to other applications.

Figure 4:
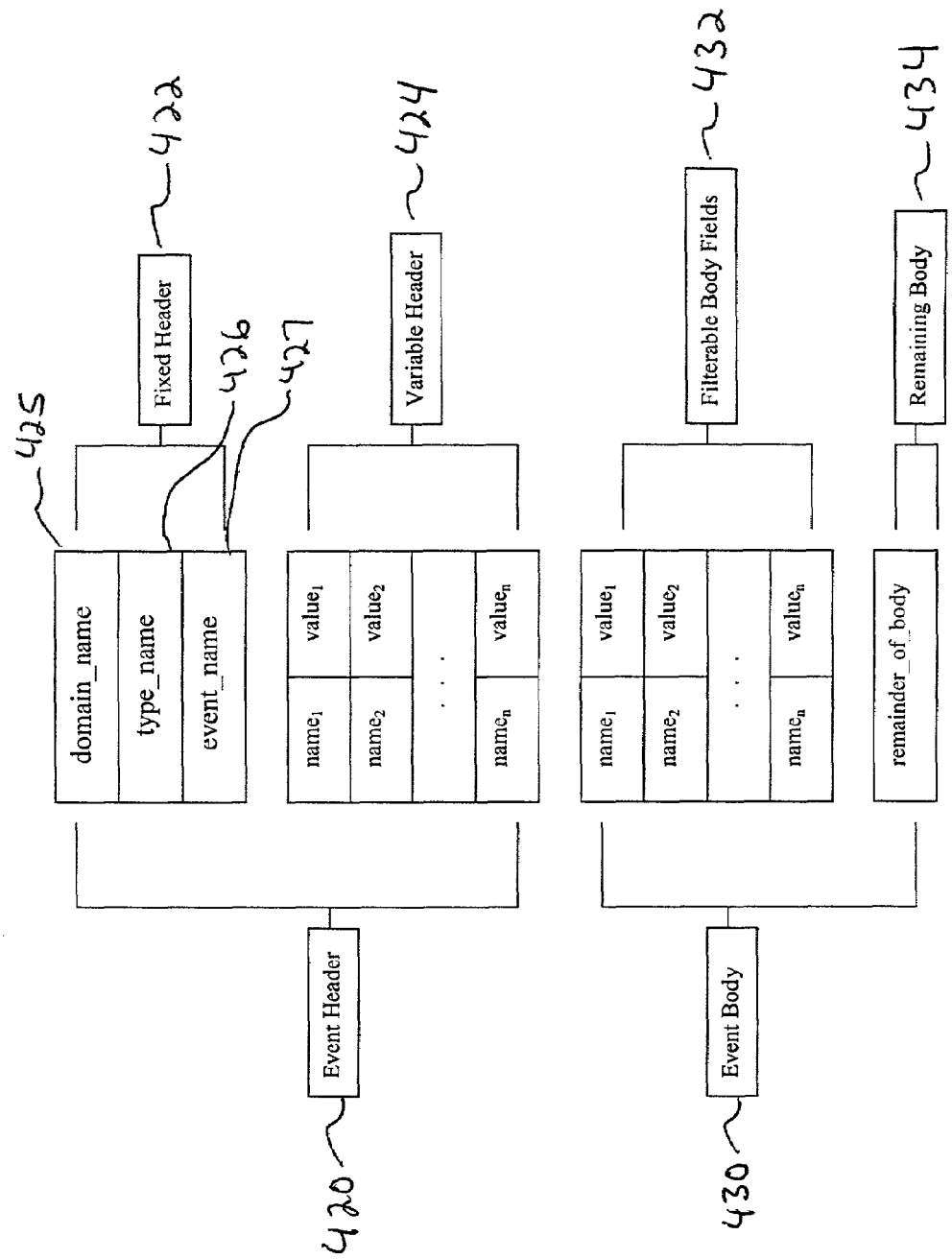
FIG. 4 is a diagrammatic representation of the data format used in the structured event.

A message is a packet of data in a specified format. The data format used for messages in the Middleware Brokering System is known as a structured event and is described in The Object Management Group's Notification Service Specification Versions 1.0 and 1.1, which are incorporated herein by reference in their entirety and from which the following descriptions of the fields in a structured event are taken. The use of a structured event provides a common format for all data being transferred within the Middleware Brokering System. As illustrated in FIG. 4, the structured event data format consists of an event header 420 and an event body 430. The event header 420 contains a fixed header 422 and a variable header 424 while the event body 430 contains filterable body fields 432 and the remaining body 434.

Three fields make up the fixed header 422: domain_name 425, type_name 426, and event_name 427. The domain_name field 425 contains a string that identifies the vertical industry domain (e.g., telecommunications, healthcare, finance, etc.) within which the type of event that characterizes a given structured event is defined. The Middleware Brokering System has adopted the following format for the domain_name 425: [Company].[Project ID].[Application ID].[Application Context]. An example could be "Sprint.ION.OM.xDSL". The type_name field 426 contains a string that identifies the type of event contained within a given structured event, for example, "orderReceived" or "orderProcessed". The domain_name 425 and the type_name 426 jointly make up an event type that is unique among all event types within a particular business enterprise. It is this unique event name that is used by publishers to specify the subject matter of the messages they are publishing and by subscribers to specify the subject matter of messages they are interested in receiving.

The event_name field 427 contains a string that names a specific instance of structured event. Event_names 427 are supplied by the publisher of an event and typically consist of sequential numbers, different numbers being given to each event. By providing all events with a unique name, the event_name 427, together with the domain_name 425 and the type_name 426, allows the Middleware Brokering System to uniquely identify an event on the channel. The remainder of the event header 420 of a structured event is contained within the variable header 424, which contains a sequence of name/value pairs.

The event body 430 of a structured event is intended to contain the data portion of a message. Its contents are broken down into two sections: the filterable body 432 and the remaining body 434. The filterable body 432 portion of the event body 430 of a structured event is a sequence of name/value pairs. This portion of the event body 430 holds fields upon which filtering is likely to be performed. The remaining body 434 portion of the event body 430 is intended to hold event data upon which filtering is not likely to be performed.

As discussed previously, the Middleware Brokering System uses adapters to convert data into and out of the structured event format. While the following discussion deals only with the mainframe and JMS adapters, similar processes would occur in alternative embodiments of the invention using other adapters.

When the mainframe 310 needs to publish a message, it places the message in the form of a copybook and sends the copybook to the mainframe adapter 340. The mainframe adapter 340 then converts the copybook into a structured event and sends the structured event to the message brokering server 360. Similarly, when the mainframe 310 acts as a subscriber and needs to receive a message, the message brokering server 360 sends the message in the form of a structured event to the mainframe adapter 340. The mainframe adapter 340 then converts the structured event into a copybook and sends the copybook to the mainframe 310.

When the mainframe 310 acts as a publisher, data is placed in a copybook with a format similar to that below and is sent to the mainframe adapter 340.

```
03  STRUCTURED-EVENT.
    05    EVENT-HEADER.
          10    MB-HEADER.
                15    OP-TYPE            PIC X(04).    //Renamed
                15    CHANNEL-NAME       PIC X(256).
          10    FIXED-EVENT-HEADER.
                15    DOMAIN-NAME        PIC X(256).
                15    TYPE-NAME          PIC X(256).
                15    EVENT-NAME         PIC X(256).   //New
//Customer portion of copybook
03  DATA-HEADER
    05    DATA                           PIC X(30000).
03  R-DATA REDEFINES DATA-HEADER.
    05    R-CODE                         PIC 9(04).
    05    R-TEXT                         PIC X(3096).
    05    FILLER                         PIC X(27050).
```

The following is an explanation of each of the fields.

OP-TYPE—This field specifies the operation to be taken by the Middleware Brokering System, such as "publish" or "subscribe".

CHANNEL-NAME—The name of the channel to which an event is to be published.

DOMAIN-NAME—Refers to the domain name in the following format: [Company].[Project ID].[Application ID].[Application Context]

TYPE-NAME—A string identifying the name of the event (e.g., "orderReceived", "orderProcessed")

EVENT-NAME—Uniquely identifies the instance of an event. The mainframe publisher must supply the EVENT-NAME.

DATA—This is the portion of the message that is populated with data for sending to the Middleware Brokering System. The data is in the following format:
If the data is intended for the Filterable Body:
<FB>key,length,value,key,length,value</FB>
If the data is intended for the Remainder of Body:
Blob of data R-DATA—These fields are used by the mainframe adapter 340 to inform the mainframe 310 whether or not a message has been successfully transmitted from the mainframe 310 to the message brokering server 360.

A program running on the mainframe 310 uses standard commands to populate the copybook and send the copybook to the mainframe adapter 340. The mainframe adapter 340 converts the copybook into a structured event by mapping the copybook fields onto the structured event fields. DOMAIN-NAME in the copybook is mapped onto domain_name 425 in the structured event, TYPE-NAME in the copybook is mapped onto type_name 426 in the structured event, EVENT-NAME in the copybook is mapped onto event_name 427 in the structured event, and DATA in the copybook is mapped onto the remaining body 434 in the structured event. The mainframe adapter 340 then sends the structured event to the message brokering server 360 which stores it in the underlying publish/subscribe engine 370. The message brokering server 360 compares the data in the domain_name 425 and type_name 426 portions of the structured event to the domain names and type names that subscribers have registered an interest in. If the message brokering server 360 finds a match between the domain_name 425 and type_name 426 supplied by a publisher and a domain name and type name registered by a subscriber, the message brokering server 360 retrieves the appropriate message from the publish/subscribe engine 370 and sends the message to the appropriate subscriber.

The mainframe adapter 340 has the capability to notify the mainframe 310 whether or not a message was successfully transmitted from the mainframe 310 to the message brokering server 360. The R-DATA portion of the copybook contains a field called R-CODE into which the mainframe adapter 340 inserts values indicating whether the transmission was successful. When the mainframe 310 attempts to send a message to the message brokering server 360, the mainframe adapter 340 determines whether the transmission was successful, populates the R-CODE field with the appropriate return code to indicate success or failure, and sends the message back to the mainframe 310. It is the responsibility of the mainframe application that published the message to check this field and determine the appropriate action if the transmission was unsuccessful.

The mainframe 310 subscribes to events by sending the CHANNEL-NAME, DOMAIN-NAME, and TYPE-NAME of the events in which it has an interest to the mainframe adapter 340. The mainframe adapter 340 stores this data in a file to which the message brokering server 360 has access. If the message brokering server 360 finds a match between a CHANNEL-NAME, DOMAIN-NAME, and TYPE-NAME subscribed to by the mainframe 310 and the data in similar fields published by another application, the message brokering server 360 sends the appropriate message to the mainframe 310.

Any event subscribed to by the mainframe 310 will be sent from the Middleware Brokering System in the generic copybook format shown above unless a different format is specifically provided by the publisher of the event. The mainframe adapter 340 will take the data in the filterable body 432 of the structured event and convert it into a "key,length,value,key,length,value" format string. This string will populate the DATA portion of the copybook which will then be sent to the mainframe 310. If the filterable body 432 contains data in anything other than a string format, the mainframe adapter 340 will not convert it to the string format. Instead, the mainframe adapter 340 will insert the characters 'BAD_DATA' in the place where the data would go. If an event needs to be sent in a format other than that of the generic copybook, the publisher of the event is responsible for mapping the structured event onto the specific copybook to be used. If the generic copybook is used, any data in the remaining body field 434 will be ignored.

Similar to the case when the mainframe 310 acts as a publisher, the copybook contains a field that allows values to be inserted indicating whether the copybook was successfully transferred from the message brokering server 360 to the mainframe 310. The mainframe adapter 340 periodically checks this field and resends the message if a delivery failure is indicated.

Java Messaging Service (JMS) is a specification for an asynchronous messaging system developed under the leadership of Sun Microsystems that allows programs written in the Java programming language to communicate with other message services. Vendors including Sun Microsystems offer products that implement the JMS specification. For purposes of this application, the term JMS refers to any JMS implementation. A JMS message has three parts: a header, an optional properties section, and an optional body section. The header contains ten predefined fields used to identify and route messages: JMSDestination, JMSDeliveryMode, JMSExpiration, JMSPriority, JMSMessageID, JMSTimestamp, JMSCorrelationID, JMSReplyTo, JMSType, and JMSRedelivered. The optional properties section may be used if additional message properties beyond those provided by the header are needed. JMS provides five message body formats, known as message types: MapMessage, TextMessage, BytesMessage, StreamMessage, and ObjectMessage. The MapMessage type contains a set of name/value pairs and is the preferred message type for messages transmitted to and from the Middleware Brokering System since it maps easily with a structured event.

When the JMS network 330 needs to publish a message, a JMS application places the message in the form of a JMS MapMessage and sends the MapMessage to the JMS adapter 350. The JMS adapter 350 then converts the MapMessage into a structured event by mapping the fields in the MapMessage to the fields in the structured event. The domain name and type name properties of the message are concatenated by the JMS application in the form DomainName:TypeName and are placed in the JMSType field in the header section of the MapMessage. The JMS adapter 350 maps the DomainName portion of the concatenated JMSType field onto the domain_name 425 field in the fixed header 422 of the structured event and maps the TypeName portion of the concatenated JMSType field onto the type_name 426 field in the fixed header 422 of the structured event. If the JMS application does not properly set the JMSType field, the JMS adapter 350 populates this field with a default value. The MapMessage does not supply a value for the event_name 427 field in the structured event. This field is instead set by the message brokering server 360 upon receipt of a message.

Other fields in the header section of the MapMessage are mapped onto the variable header 424 section of the structured event. The JMSMessageID field in the MapMessage is mapped onto a field given the name JMSMessageID in the variable header 424 of the structured event, the JMSTimestamp field in the MapMessage is mapped onto a field given the name JMSTimestamp in the structured event, and the JMSDeliveryMode field in the MapMessage is mapped onto a field given the name EventReliability in the structured event. The remaining JMS header fields are not mapped.

The properties section of a JMS message, if used, is mapped onto the filterable body 432 section of a structured event. The JMS adapter 350 maps fields with one of Java's primitive data types (boolean, byte, short, integer, long, float, double, and string) directly onto fields with similar data types in the filterable body 432. The body section of a JMS message, if used, is mapped onto the remaining body 434 of a structured event. When the recommended MapMessage body format is used, the JMS adapter 350 maps fields with one of the primitive data types directly onto fields with similar data types in the remaining body 434. For both the properties and body sections of a JMS MapMessage, if a user defined data type is used instead of a Java primitive data type, the JMS adapter 350 maps the data with a string data type and a value of "UNKNOWN_DATA".

When the JMS adapter 350 completes the mapping of a JMS MapMessage to a structured event, the JMS adapter 350 sends the structured event to the message brokering server 360. The message brokering server 360 and the publish/subscribe engine 370 then act together as a message broker and match the published message with interested subscribers in a process similar to that previously described for the mainframe adapter 340.

When the JMS network 330 acts as a subscriber and needs to receive a message, the message brokering server 360 sends the message in the form of a structured event to the JMS adapter 350. The JMS adapter 350 then converts the structured event into a MapMessage and sends the MapMessage to the JMS network 330. The domain_name 425, type_name 426, and event_name 427 fields of the fixed header 422 in the structured event are mapped onto the header section of the JMS MapMessage. The JMS adapter 350 concatenates the domain_name 425 and type_name 426 fields into a single value with the format DomainName:TypeName and places that value in the JMSType field of the JMS header. The event_name 427 field of the structured event is mapped onto the JMSCorrelationID field of the MapMessage. The structured event received from the message brokering server 360 contains a field named Timestamp in the variable header 424 section that indicates the time the message brokering server 360 received the message. This field is mapped onto a field in the properties section of the MapMessage called MBTimestamp. The filterable body 432 section of the structured event is mapped onto the properties section of the MapMessage and the remaining body 434 section of the structured event is mapped onto the body section of the MapMessage. Similar to the case when the JMS network 330 acts as a publisher, the JMS adapter 350 maps fields with one of the primitive data types in the filterable body 432 and remaining body 434 sections of the structured event directly onto fields with similar data types in the properties and body sections of the MapMessage. For both the filterable body 432 and remaining body 434 sections of the structured event, if a user defined data type is used instead of a Java primitive data type, the JMS adapter 350 maps the data with a string data type and a value of "UNKNOWN_DATA".

Quality of service refers to the capability of a messaging system to verify the integrity of message delivery and includes features such as the priority of the message, verification of delivery, and delivery date and time. Users of the Middleware Brokering System can use the quality of service attributes to customize the message brokering functionality to meet their needs by designating whether they want, for example, guaranteed delivery at a slower transmission rate or a high transmission rate but no guarantee of delivery. Quality of service is achieved in the Middleware Brokering System through the properties of the channels in the publish/subscribe engine 370. Each channel is assigned different quality of service attributes and a publishing application with particular quality of service requirements will specify that the message it is sending must be transmitted on the channel whose attributes match its requirements. Alternatively, an application can create its own channel and define its own quality of service attributes. With existing technologies, mainframe Cobol systems cannot include quality of service attributes when communicating with distributed systems in a publish/subscribe mode. By using Cobol copybooks that are converted into structured events and stored in the channels of a publish/subscribe engine, the Middleware Brokering System provides quality of service attributes to these systems.

FIG. 5 illustrates a method for asynchronous brokering of messages between middleware computing systems, comprising: receiving a message from a sending middleware computing system into a middleware brokering server; and sending the message from the middleware brokering server to at least one receiving middleware computing system. Wherein the message is converted from a native language format of the sending middleware computing system to a structured event message format prior to being sent by the middleware brokering server. Wherein the message is converted from a structured event message format to a native language format of the receiving middleware computing system prior to being received by the receiving middleware computing system.

The invention claimed is:

1. A method for asynchronous brokering of messages between middleware computing systems, comprising:
 a) receiving a message sent from a first application into a first middleware computing system, the first middleware computing system facilitating data exchange among a first group of disparate applications comprising the first application and one or more applications;
 b) converting the message from a native language format of the first application to a native language format of the first middleware computing system;
 c) receiving the message sent from the first middleware computing system into a middleware brokering server;
 d) converting the message from the native language format of the first middleware computing system to a standard format of the middleware brokering server;
 e) converting the message from the standard format of the middleware brokering server to a native language format of a second middleware computing system, the second middleware computing system facilitating data exchange among a second group of disparate applications comprising a second application and one or more applications;
 f) sending the message from the middleware brokering server to the second middleware computing system that receives the message;
 g) converting the message from the native language format of the second middleware computing system to a native language format of the second application; and
 h) sending the message from the second middleware computing system to the second application that receives the message.

2. The method of claim 1 wherein the sending first middleware computing system and the receiving second middleware computing system are selected from the group consisting of a mainframe system, a CORBA compliant system, and a JMS system.

3. The method of claim 2 wherein the sending first middleware computing system communicates with the middleware brokering server via point to point messaging and wherein the middleware brokering server communicates with the receiving second middleware computing system via publish and subscribe messaging.

4. The method of claim 3 wherein the sending first middleware computing system of a first message is the receiving second middleware computing system of a second message.

5. The method of claim 3 wherein the receiving second middleware computing system of a first message is the sending first middleware computing system of a second message.

6. The method of claim 3 wherein the publish and subscribe messaging further comprises a push-pull paradigm across at least one messaging channel.

7. The method of claim 6 further comprising designating quality of service attributes when configuring the channel.

8. The method of claim 1 wherein the message is converted from the native language format of the sending first middleware computing system by mapping a plurality of fields in the native format into corresponding fields in the standard format of the middleware brokering server.

9. The method of claim 8 wherein the native language format of the sending first middleware computing system is selected from the group consisting of a Cobol copybook, JMS TextMessage, JMS BytesMessage; JMS MapMessage; JMS ObjectMessage; and JMS StreamMessage.

10. The method of claim 8 wherein the sending first middleware computing system is a mainframe system and the native language format is a COBOL copybook.

11. The method of claim 8 wherein the sending first middleware computing system is a JMS system and the native language format is a JMS MapMessage.

12. The method of claim 1 wherein the message is converted from the standard format of the middleware brokering server by mapping a plurality of fields in the standard format into corresponding fields in the native language format of the receiving second middleware computing system.

13. The method of claim 12 wherein the native language format of the receiving second middleware computing system is selected from the group consisting of a Cobol copybook, JMS TextMessage, JMS BytesMessage; JMS MapMessage; JMS ObjectMessage; and JMS StreamMessage.

14. The method of claim 12 wherein the receiving second middleware computing system is a mainframe system and the native language format is a COBOL copybook.

15. The method of claim 12 wherein the receiving second middleware computing system is a JMS system and the native language format is a JMS MapMessage.

16. The method of claim 1 wherein the standard format of the middleware brokering server is a structured event message format.

* * * * *